United States Patent
Basak et al.

(10) Patent No.: US 12,081,162 B2
(45) Date of Patent: Sep. 3, 2024

(54) SYSTEM AND METHOD FOR OPERATING A RENEWABLE ENERGY SOURCE IN GRID-FORMING MODE (GFM) AS A VIRTUAL SYNCHRONOUS MACHINE (VSM) WITH DAMPER WINDING EMULATION

(71) Applicant: General Electric Renovables Espana, S.L., Barcelona (ES)

(72) Inventors: Rupam Basak, Howrah (IN); Arvind Kumar Tiwari, Niskayuna, NY (US); Veena Padmarao, Bengaluru (IN); Rabisankar Roy, Bengaluru (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/895,476

(22) Filed: Aug. 25, 2022

(65) Prior Publication Data

US 2024/0072698 A1    Feb. 29, 2024

(51) Int. Cl.
*H02P 9/00* (2006.01)
*H02J 3/38* (2006.01)
(Continued)

(52) U.S. Cl.
CPC .............. *H02P 9/007* (2013.01); *H02J 3/381* (2013.01); *H02J 3/40* (2013.01); *H02J 2300/28* (2020.01); *H02P 2101/15* (2015.01)

(58) Field of Classification Search
CPC ...... H02P 9/007; H02P 2101/15; H02J 3/381; H02J 3/40; H02J 2300/28
See application file for complete search history.

(56) References Cited

U.S. PATENT DOCUMENTS 5,798,633 A    8/1998 Larsen et al.
7,119,452 B2   10/2006 Larsen
(Continued)

FOREIGN PATENT DOCUMENTS

CN    107658904 A    2/2018
CN    109494709 A    3/2019
(Continued)

OTHER PUBLICATIONS

Avazov et al., Damping of Torsional Vibrations in a Type-IV Wind Turbine Interfaced to a Grid-Forming Converter, TechRxiv Preprint, IEEE, 2021, 7 Pages. https://www.techrxiv.org/articles/preprint/Damping_of_Torsional_Vibrations_in_a_Type-IV_Wind_Turbine_Interfaced_to_a_Grid-Forming_Converter/14893161https://doi.org/10.36227/techrxiv.14893161.v1.

(Continued)

*Primary Examiner* — Joseph Ortega
(74) *Attorney, Agent, or Firm* — Dority & Manning, P.A.

(57) ABSTRACT

A method and associated system provide grid-forming mode (GFM) control of an inverter-based renewable energy source having an asynchronous machine connected to a power grid. The method includes deriving a power error signal ($P_{ER}$) between a real power output ($P_B$) from the renewable energy source and a power reference ($P_{REF}$) representing a desired power output of the renewable energy source. With an inertial power regulator, a phase shift angle ($\delta_{IT}$) is generated from the power error signal ($P_{ER}$) to provide virtual synchronous machine (VSM) control functionality to the GFM control of the renewable energy source. A power angle compensation ($\Delta\delta$) is applied to the phase shift angle ($\delta_{IT}$) from the inertial power regulator to dampen power oscillations and load fluctuations during transient power events.

17 Claims, 9 Drawing Sheets

(51) Int. Cl.
 H02J 3/40 (2006.01)
 H02P 101/15 (2016.01)

(56) References Cited

U.S. PATENT DOCUMENTS

| | | | |
|---|---|---|---|
| 7,423,352 | B2 | 9/2008 | Suryanarayanan et al. |
| 7,518,344 | B2 | 4/2009 | Sihler |
| 7,804,184 | B2 | 9/2010 | Yuan et al. |
| 8,880,236 | B2 | 11/2014 | Weiss et al. |
| 9,270,194 | B2 | 2/2016 | Brogan et al. |
| 9,300,142 | B2 | 3/2016 | Tarnowski |
| 9,528,499 | B2 | 12/2016 | Knuppel et al. |
| 9,660,452 | B2 | 5/2017 | Routimo |
| 9,660,453 | B2 | 5/2017 | Majumder |
| 10,156,225 | B2 | 12/2018 | Huang et al. |
| 10,320,192 | B2 | 6/2019 | Bamberger et al. |
| 10,389,129 | B2 | 8/2019 | Harnefors et al. |
| 10,651,771 | B2 | 5/2020 | Zhong |
| 2009/0200803 | A1 | 8/2009 | Ichinose et al. |
| 2009/0278351 | A1 | 11/2009 | Rivas et al. |
| 2010/0142237 | A1 | 6/2010 | Yuan et al. |
| 2014/0307488 | A1 | 10/2014 | Brogan et al. |
| 2014/0316604 | A1 | 10/2014 | Ortjohann et al. |
| 2018/0191281 | A1 | 7/2018 | Zhong |
| 2018/0269819 | A1 | 9/2018 | Tuckey et al. |
| 2019/0386593 | A1 | 12/2019 | Zhong |
| 2022/0190681 | A1 | 6/2022 | Shine et al. |
| 2022/0316443 | A1* | 10/2022 | Zhang ............... H02P 9/007 |
| 2022/0321041 | A1* | 10/2022 | Ebrahimzadehveshareh ............... H02J 3/381 |

FOREIGN PATENT DOCUMENTS

| | | | |
|---|---|---|---|
| EP | 2523298 | B1 | 11/2012 |
| EP | 2792042 | B1 | 2/2016 |
| EP | 3533996 | A1 | 9/2019 |
| WO | WO2015/131958 | A1 | 9/2015 |
| WO | WO2017/069746 | A1 | 4/2017 |
| WO | WO2019/149561 | A1 | 8/2019 |
| WO | WO2020/043306 | A1 | 3/2020 |
| WO | WO2020/052937 | A1 | 3/2020 |
| WO | WO2020/135904 | A1 | 7/2020 |
| WO | WO2020/135905 | A1 | 7/2020 |
| WO | WO2020/221546 | A1 | 11/2020 |
| WO | WO2021129914 | A1 | 7/2021 |
| WO | WO2021145877 | A1 | 7/2021 |
| WO | WO2022/028660 | A1 | 2/2022 |

OTHER PUBLICATIONS

Fateh et al., Torsional Vibrations in the Drivetrain of DFIG- and PMG Based Wind Turbines: Comparison and Mitigation, DSCC2015-9953, Proceedings of the ASME 2015 Dynamic Systems and Control Conference, Columbus OH, Oct. 2015, 8 Pages. https://www.researchgate.net/publication/290434827_Torsional_Vibrations_he_Drivetrain_of_DFIG-_and_PMG-Based_Wind_Turbines_Comparison_and_Mitigation/link/56a2437708ae232fb201945b/download.

Huang et al., Synchronization and Frequency Regulation of DFIG-Based Wind Turbine Generators with Synchronized Control, IEEE Transactions on Energy Conversion, vol. 32, Issue 3, Sep. 2017, pp. 1251-1262. (Abstract Only).

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

Nian et al., Improved Virtual Synchronous Generator Control of DIFG to Ride-Through Symmetrical Voltage Fault, IEEE Transactions on Energy Conversion, vol. 35, Issue 2, Jun. 2020, pp. 672-683. (Abstract Only).

Wang et al., On Inertial Dynamics of Virtual-Synchronous-Controlled DFIG-Based Wind Turbines, IEEE Transactions on Energy Conversion, vol. 30, Issue 4, Dec. 2015, pp. 1691-1702. (Abstract Only).

Wang et al., Virtual Synchronous Control for Grid-Connected DFIG-Based Wind Turbines, IEEE Journal of Emerging and Selected Topics in Power Electronics, vol. 3, Issue 4, Dec. 2015, pp. 932-944. (Abstract Only).

European Search Report Corresponding to EP23193136 on Feb. 1, 2024.

Arasteh et al., Fault Ride Through Capability of Grid Forming Wind Turbines: A Comparison of Three Control Schemes, XP006115486, IET Renewable Power Generation, vol. 16, No. 9, May 2022, 1866-1881.

Edrah et al., Effects of POD Control on a DFIG Wind Turbine Structural System, XP011789177, IEEE Transactions on Energy Conversion, , vol. 35, No. 2, 2020, 765-774.

Zhang, Virtual Shaft Control of DFIG-Based Wind Turbines for Power Oscillation Suppression, XP011920946, IEEE Transactions on Sustainable Energy, vol. 13, No. 4, 2022, 2316-2330.

* cited by examiner

E1: terminal voltage of VSM
$\delta IT$: VSM Power angle
X1: effective impedance (stator leakage + virtual impedance)
Pe0: steady state power
Vg: grid voltage
$\delta IT_{MOD}$: Modified Power angle

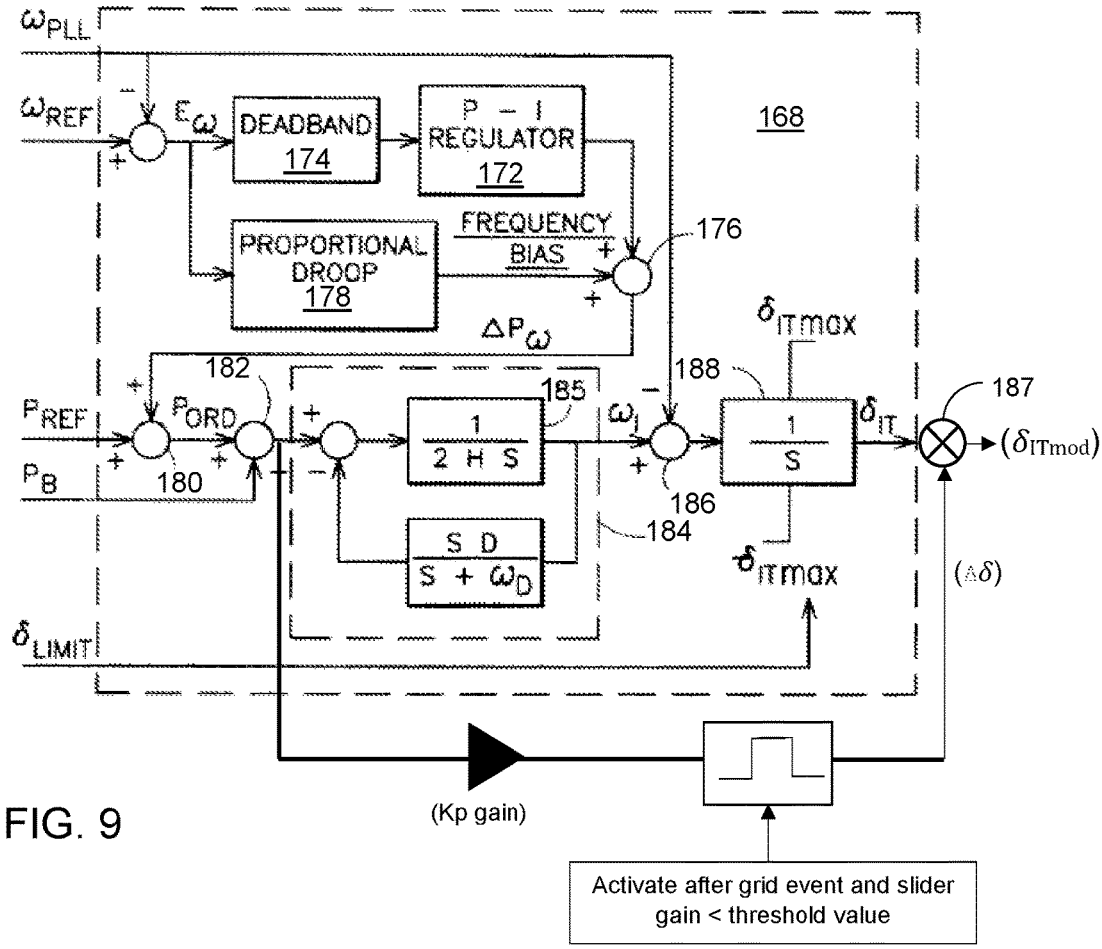

FIG. 9

P_REF = (GFM) P_Cmd
P_B = power feedback (Pfbk(gfm))
$\omega_{PLL}$ = speed of VSM synchronous rotating field
$\omega_1$ = VSM rotor speed
$\delta_{IT}$ = VSM rotor angle (power angle)
modified $\delta_{IT}$ ($\delta_{ITmod}$) = ($\delta_{IT}$) + ($\Delta\delta$)

E1: terminal voltage of VSM
$\delta$: Power angle
X1: effective impedance (stator leakage + virtual impedance)
Pe0: steady state power
Vg/0: grid voltage ($\Delta\delta$) = f($\Delta$Pe0, B)
  Pe0 = steady state power = (E1*Vg/X1)*sin($\delta$0)
  ($\Delta$Pe0) = Kp*(Pcmd(gfm) – Pfbk(gfm))
  B = E1*Vg/X1
  Kp = control gain constant ($\Delta\delta$) = Sin$^{-1}$(Pe0 + Pe0/B) – $\delta$0
($\Delta\delta$) = ~ $\Delta$Pe0/B

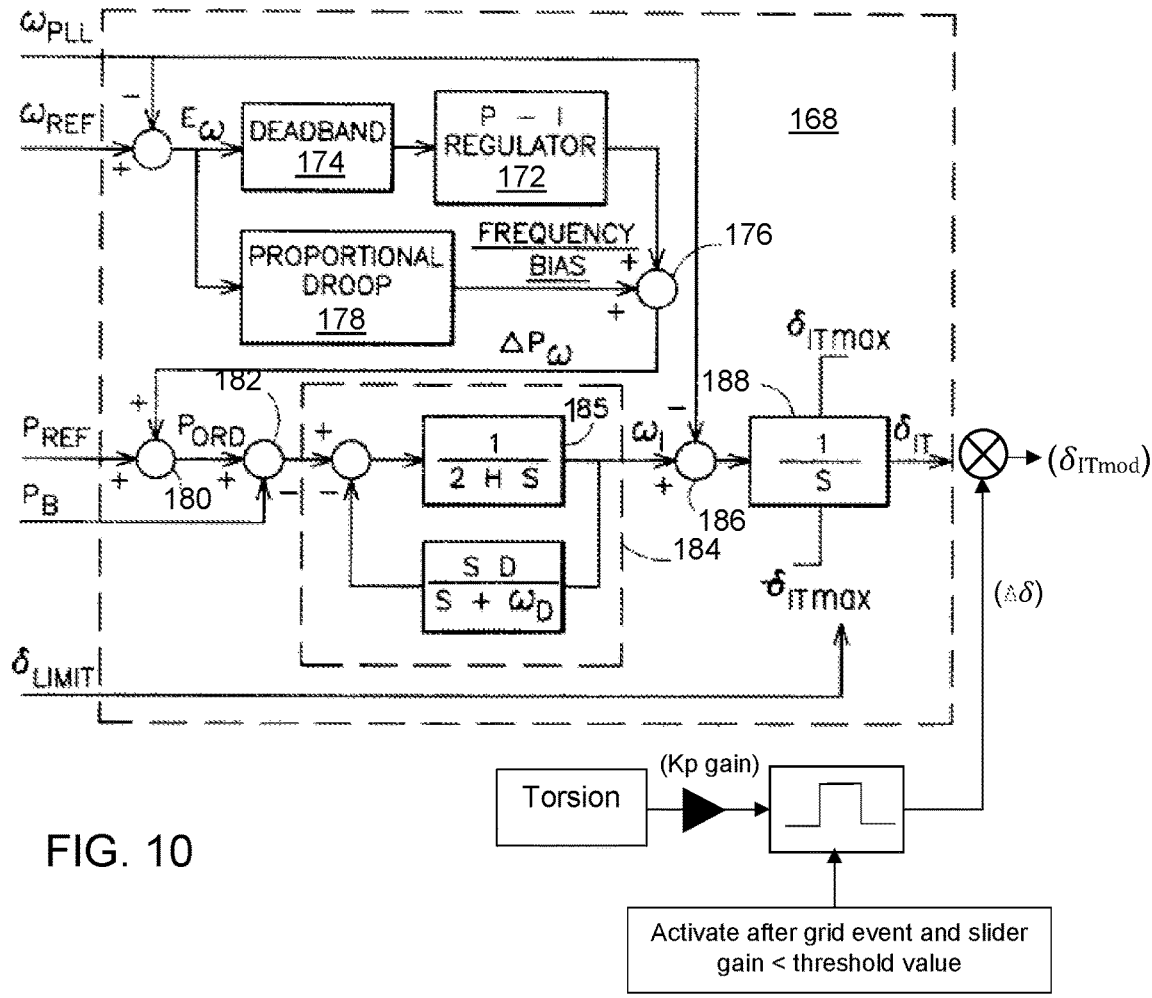

FIG. 10

$P_{REF}$ = (GFM) $P_{Cmd}$
$P_B$ = power feedback (Grid measured Power)
$\omega_{PLL}$ = speed of VSM synchronous rotating field
$\omega_1$ = VSM rotor speed
$\delta_{IT}$ = VSM rotor angle (power angle)
modified $\delta_{IT}$ ($\delta_{ITmod}$) = ($\delta_{IT}$) + ($\Delta\delta$)

E1: terminal voltage of VSM
$\delta$: Power angle
X1: effective impedance (stator leakage + virtual impedance)
Pe0: steady state power
Vg/0: grid voltage ($\Delta\delta$) = f($\Delta$Pe0, B)
  B = E1*Vg/X1
  Pe0 = (E1*Vg/X1)*sin($\delta$0)
  Additional DTD torque ($T_{DTDadd}$) = Kp*torsion
  Kp = control gain constant
  ($\Delta$Pe0) = Speed* ($T_{DTDadd}$)

($\Delta\delta$) = Sin$^{-1}$(Pe0 + Pe0/B) − $\delta$0
($\Delta\delta$) ~ $\Delta$Pe0/B

SYSTEM AND METHOD FOR OPERATING A RENEWABLE ENERGY SOURCE IN GRID-FORMING MODE (GFM) AS A VIRTUAL SYNCHRONOUS MACHINE (VSM) WITH DAMPER WINDING EMULATION

FIELD

The present disclosure relates generally to operation of a renewable energy source, such as a wind turbine power system, and more particularly, to systems and methods for operating a wind turbine as a virtual synchronous machine (VSM) to provide grid-forming control of the wind turbine power system.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of wind power systems, penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

In addition, the reduction in the proportion of synchronous machines with respect to asynchronous machines, which determine the grid defining parameters voltage and frequency, have contributed to decreasing stability margins. The immediate consequence of the decreased stability margins is a grid collapse when subjected to voltage and frequency disturbances in the grid.

Accordingly, many existing asynchronous machines, such as a doubly-fed generator in a wind turbine power system, operate in a "grid-following mode." Grid-following type devices utilize fast current-regulation loops to control active and reactive power exchanged with the grid. In this mode, the active power reference to the converter is developed by the energy source regulator, e.g., the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the doubly-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, "grid-forming mode" (GFM) type converters provide a voltage-source characteristic, where the angle and magnitude of the voltage are controlled to achieve the regulation functions needed by the grid. In GFM mode, the renewable resource is controlled to be operated as a virtual synchronous machine (VSM) having an inertial power regulator replicating synchronous machine behavior. Similar to an actual synchronous machine, this control exhibits an inertial response. Also, in GFM mode control, the predominant system variables of frequency and terminal voltage magnitude are regulated. With this structure, current will flow according to the demands of the grid while the converter contributes to establishing a voltage and frequency for the grid. This characteristic is comparable to conventional generators based on a turbine driving a synchronous machine.

Thus, a GFM source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Double-Feb Wind Turbine Generator."

To be effective, GFM inverter-based resources (IBRs) must be able to maintain an internal voltage phasor that does not move quickly when there are changes in grid conditions, e.g., sudden addition/removal of loads, opening or closing of grid connections that lead to phase jumps and/or rapid change of frequency. Such events include, for example, low voltage ride through (LVRT), high voltage ride through (HVRT), multiple fault ride through (MFRT), and phase jump events. In other words, the power from the grid-forming resource must be able to change suddenly to stabilize the grid, with a subsequent slow reset to power being commanded from a higher-level control function. In addition, the grid-forming resource must be able to rapidly enforce power limits that exist due to constraints on the power-handling portions of the device. Such a response is needed for severe disturbances on the grid, e.g., faults where power limits will be dynamically adjusted to coordinate with grid conditions for secure recovery from the fault. Further, the grid-forming resource should be able to rapidly follow changes in commands from higher-level controls, e.g., for damping mechanical vibrations in a wind turbine. Such requirements, however, can be difficult to achieve.

As mentioned above, in grid-forming mode, the wind turbine generator is controlled to be operated as a virtual synchronous machine (VSM) having an inertial power regulator replicating synchronous machine behavior. For certain conditions, this control also exhibits a power oscillation characteristic similar to hunting in a synchronous machine. For post voltage ride through events, the power response of a VSM shows a damped oscillation before reaching the set point. These power oscillations, however, can create a significant power overshoot and undershoot under a GFM control scenario for wind turbines, which may result in the wind turbine power system being non-compliant to mandatory grid codes. In addition, these power oscillations can result in a higher electromagnetic torque overshoot and undershoot during recovery, which in turn increases the drivetrain loads.

The power oscillations also have an effect on the drivetrain components. The peak drivetrain loads increase due to the increased torque during the power oscillations. This can result in a violation of grid code compliance when, for example, the power oscillation during the fault recovery crosses limits specified by grid authority or indirectly create slip in the drivetrain, leading to turbine trip and failure to ride through the specified fault as mandated by the grid authority.

In a true synchronous machine, damper windings are used to mitigate the hunting power oscillations that occur after an extreme grid event, such as an LVRT, HVRT, or MFRT event.

It would be advantageous in the art to provide a type of compensation to VSM-controlled asynchronous machines operating in grid-forming mode that is comparable to damper winding compensation to mitigate hunting oscillations.

Accordingly, the present disclosure is directed to systems and methods for operating VSM-controlled, inverter-based, asynchronous resources with compensation akin to damper winding compensation so as to address the aforementioned issues.

BRIEF DESCRIPTION

Aspects and advantages of the invention will be set forth in part in the following description, or may be obvious from the description, or may be learned through practice of the invention.

The present disclosure relates to a method and system for controlling an inverter-based resource having an asynchronous machine connected to a power grid to provide VSM grid-forming control of the inverter-based resource, wherein such control may be activated upon an extreme transient grid event, such as an LVRT, HVRT, or MFRT event. In particular, the method and related system introduce a compensation variable to the VSM grid-forming controls via an additional power angle compensation that is akin to damper winding compensation in an actual synchronous machine. This compensation angle is summed with the output of the inertial power regulator. This method and related system improve wind turbine response during extreme grid events by damping power oscillations and reducing peak drivetrain loads, which in turn reduces the chance of slip or trip events and subsequent turbine unavailability. The present method and system also serve to minimize power oscillations that could create a significant power overshoot and undershoot under grid-forming control that could lead to a condition of non-compliance with grid code.

In a particular embodiment, the power angle compensation is derived from the error between power command and feedback inputs into inertial power regulator.

In the event that the initial power angle compensation control is not sufficient to decrease drivetrain loads below a defined limit, embodiments of the present method and system may include a subsequent control scheme wherein torsion is used as an input and is converted into an equivalent power angle compensation using stator voltage, grid voltage, speed, and machine inductance, wherein this power angle compensation is added to the output power angle command of the inertial power regulator. This acts as an additional torque on the DFIG along with the commanded torque from the VSM control scheme, similar to a damper winding in an actual synchronous machine when its speed oscillates around synchronous speed.

In particular embodiments, the inverter-based asynchronous machine may be a doubly-fed induction generator in a wind turbine power system. The method and system will be described herein with reference to a wind turbine power system but, it should be appreciated that this is for explanation purposes only and that the method and system are not limited to wind turbine power systems.

The inverter-based renewable energy source in a particular embodiment may be a wind turbine power system, wherein the asynchronous machine is a doubly-fed induction generator (DFIG).

The control functions described herein may be activated after detection of the grid event and when slider gain is below a threshold value. Other activation scenarios are also possible. For example, grid voltage could be sensed and the control function activated when such voltage indicates low voltage ride through recovery.

The output from the inertial power regulator represents a phase shift signal ($\delta_{IT}$) used to adjust a value of a phase angle ($\theta_1$) that is provided to gating logic circuitry of the wind turbine power system, wherein the power angle compensation ($\Delta\delta$) used to adjust the phase shift signal ($\delta_{IT}$). The power angle compensation ($\Delta\delta$) can be derived as a function of the power error signal (PER) input to the inertial power regulator. An example of this derivation is provided in greater detail below.

In an alternative embodiment, the DFIG is operated in torque control such that a torque demand ($T_{DEM}$) is generated and modified by a damping torque demand ($T_{DTD}$) to provide a generator torque demand ($T_{GEN}$) made on the DFIG. In this embodiment, the power angle compensation ($\Delta\delta$) may be a function of torsion induced in drivetrain components of the wind turbine power system and serves as an additional damping torque demand ($T_{DTDadd}$). The torsion value may be calculated based on a speed difference between a high speed shaft (HSS) and a low speed shaft (LSS) in the drivetrain components, or can be estimated based on the HSS speed and torque acting on the HSS. The power angle compensation (Δδ) is derived from the torsion, grid voltage, effective impedance of the wind turbine power system, and terminal voltage of the DFIG according to a function discussed in greater detail below.

The present invention also encompasses an inverter-based renewable energy source connected to a power grid, wherein the inverter-based resource includes: an asynchronous machine; a controller for controlling the inverter-based resource to provide grid-forming mode (GFM) control thereof, the controller comprising a processor configured to perform a plurality of operations. These operations may include any combination of the methods and functions discussed above.

In particular embodiments, the inverter-based renewable energy source is a wind turbine power system, and the asynchronous machine is a doubly-fed induction generator (DFIG).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 is a control diagram related to the internal power regulator depicted in FIG. 7; and FIG. 10 is a control diagram related to the internal power regulator depicted in FIG. 7.

DETAILED DESCRIPTION

Figure 1:
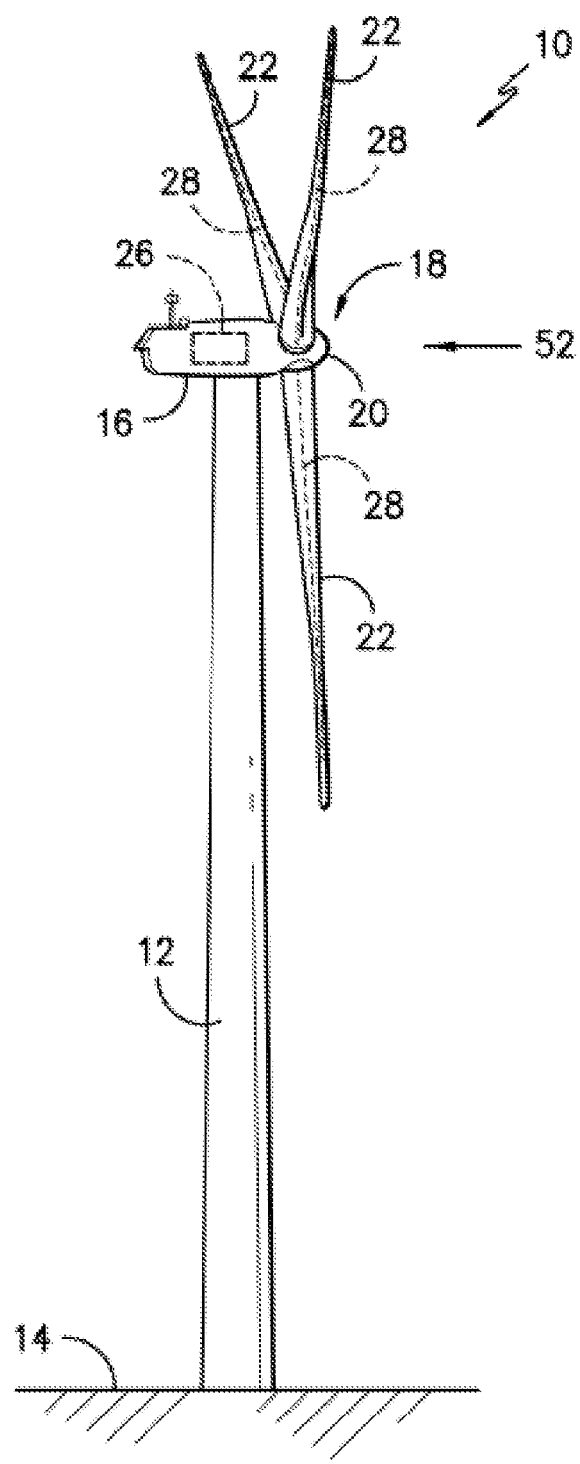
FIG. 1 illustrates a perspective view of one embodiment of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for controlling an inverter-based resource having an asynchronous machine connected to a power grid to provide grid-forming control of the inverter-based resource as a VSM. As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems. For example, in one embodiment, the inverter-based resource may be a wind turbine power system having a rotor-side converter, a line-side converter, and a doubly-fed induction generator (DFIG) connected to the power grid.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 102 (FIG. 4) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
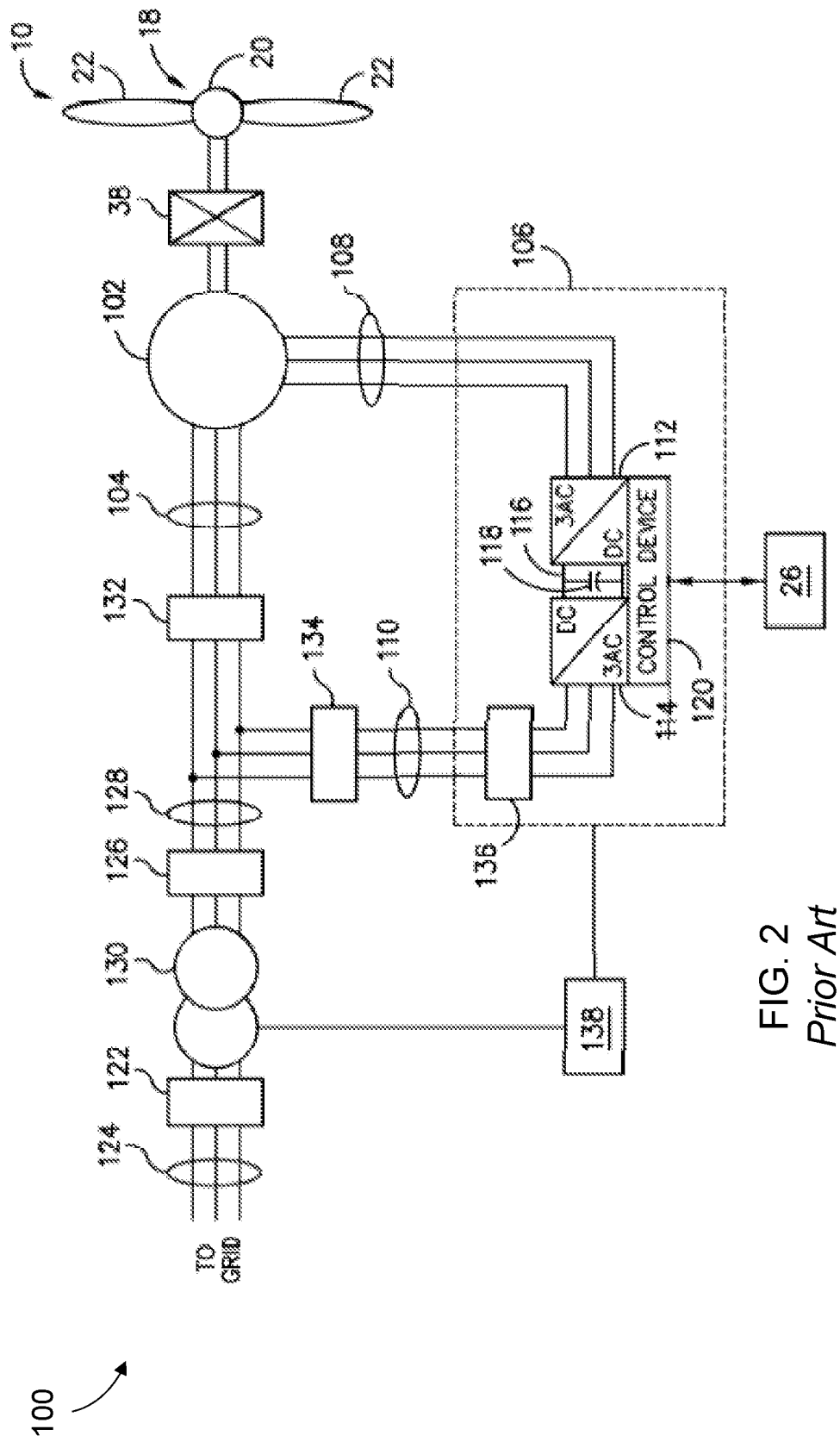
FIG. 2 illustrates a schematic view of an embodiment of a wind turbine electrical power systems suitable for use with the wind turbine shown in FIG. 1.

Referring to the wind turbine power system 100 of FIG. 2, the rotor 18 of the wind turbine 10 may be coupled to the gearbox 38 via a high speed shaft (HSS), wherein the gearbox 38 is, in turn, coupled to the generator 102 via a low speed shaft (LSS). The generator 102 may be a doubly fed induction generator (DFIG). As shown, the DFIG 102 may be connected to a stator bus 104. Further, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side converter 112 converts the AC power provided from the rotor bus 108 into direct current (DC) power and provides the DC power to the DC link 116. As is generally understood, switching elements (e.g., IGBTs) used in the bridge circuits of the rotor side converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side converter 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from the converter controller 120 via the wind turbine controller 26. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled, and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 3:
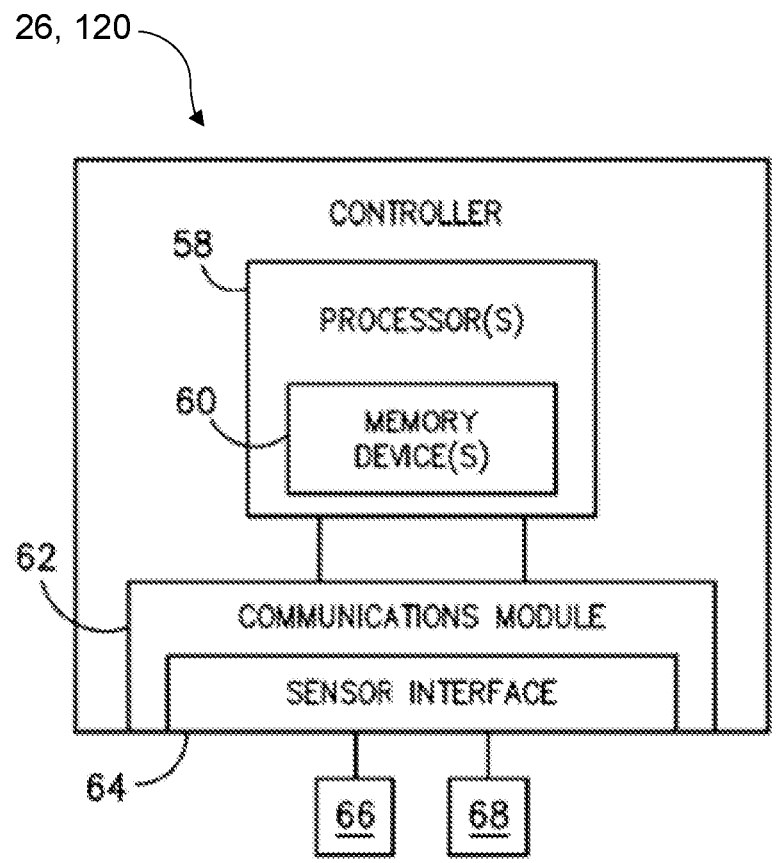
FIG. 3 illustrates a block diagram of one embodiment of a controller according to the present disclosure.

Referring now to FIG. 3, a block diagram of one embodiment of suitable components that may be included within the controller (such as any one of the converter controller 120, the turbine controller 26, and/or a farm-level controller) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 4:
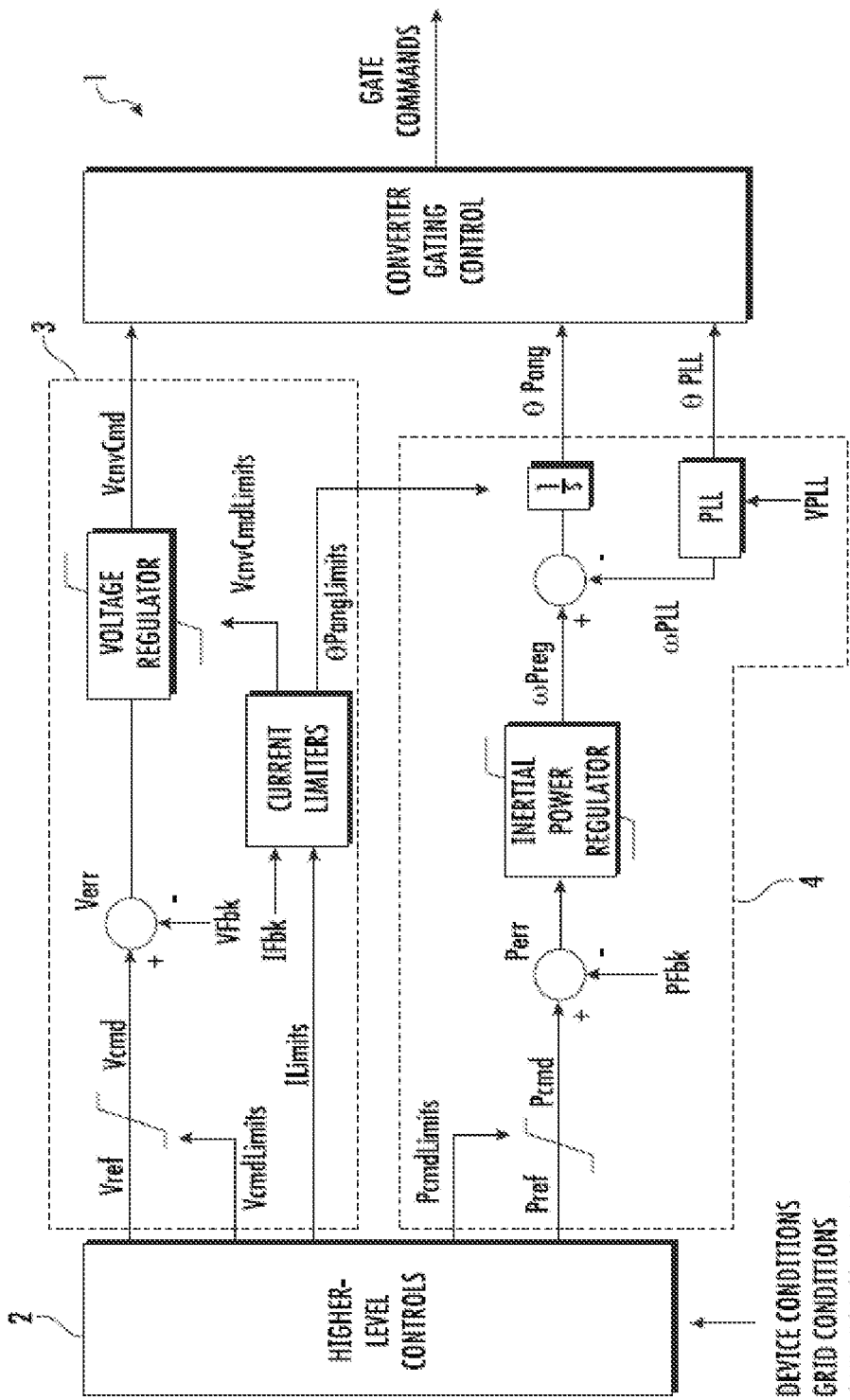
FIG. 4 illustrates a schematic diagram of an embodiment of a main circuit for grid-forming control of an asynchronous machine system according to conventional construction.

Referring now to FIG. 4, a control diagram for providing grid-forming control to a renewable resource operated as a virtual synchronous machine (VSM) according to conventional construction is illustrated. As shown, a converter controller 1 receives references (e.g., $V_{ref}$ and $P_{ref}$) and limits (e.g., $V_{cmdLimits}$ and $P_{cmdLimits}$) from higher-level controls 2. These high-level limits are on physical quantities of voltage, current, and power. The main regulators include a fast voltage regulator 3 and a slow power regulator 4, with the slow power regulator including an inertial power regulator that provides for VSM control of the machine. These regulators 3, 4 have final limits applied to the converter control commands for voltage magnitude (e.g., $V_{cnvCmd}$) and angle (e.g., $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

Figure 5:
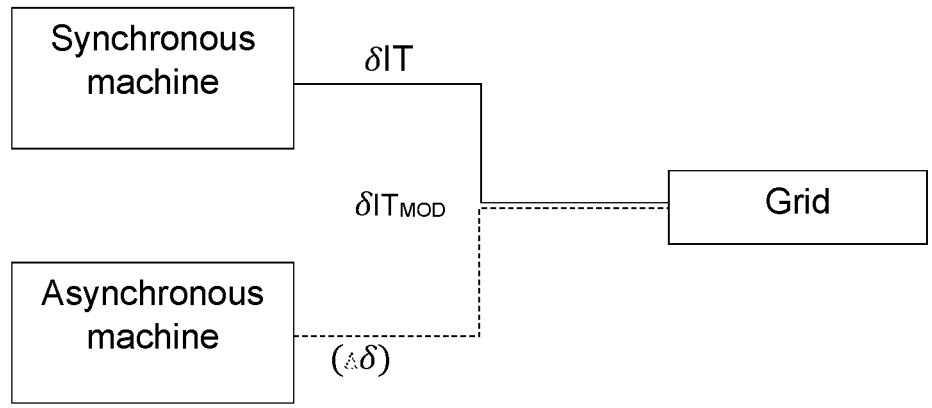
FIG. 5 is a simplified block diagram depicting principles according to the present invention.
Figure 6:
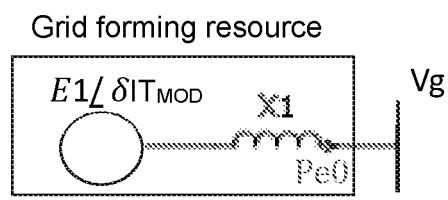
FIG. 6 is a simplified block diagram depicting principles according to the present invention.

FIGS. 5 and 6 present a simplified view of certain principles according to the invention. The GFM resource (e.g., an asynchronous IBR machine) operates at the terminal voltage (E1) of a virtual synchronous machine (VSM) having a power angle ($\delta IT$) and a fixed internal impedance X1 to produce steady state power (Pe0) at the grid voltage (Vg). The power angle of the actual synchronous machine at steady state power (Pe0) is adjusted by the power angle compensation factor ($\Delta\delta$) to simulate the synchronous machine with damper winding, which is operated as a VSM in grid-forming mode at a modified power angle ($\delta IT_{MOD}$) derived in accordance with aspects of the present disclosure discussed in more detail below.

Figure 7:
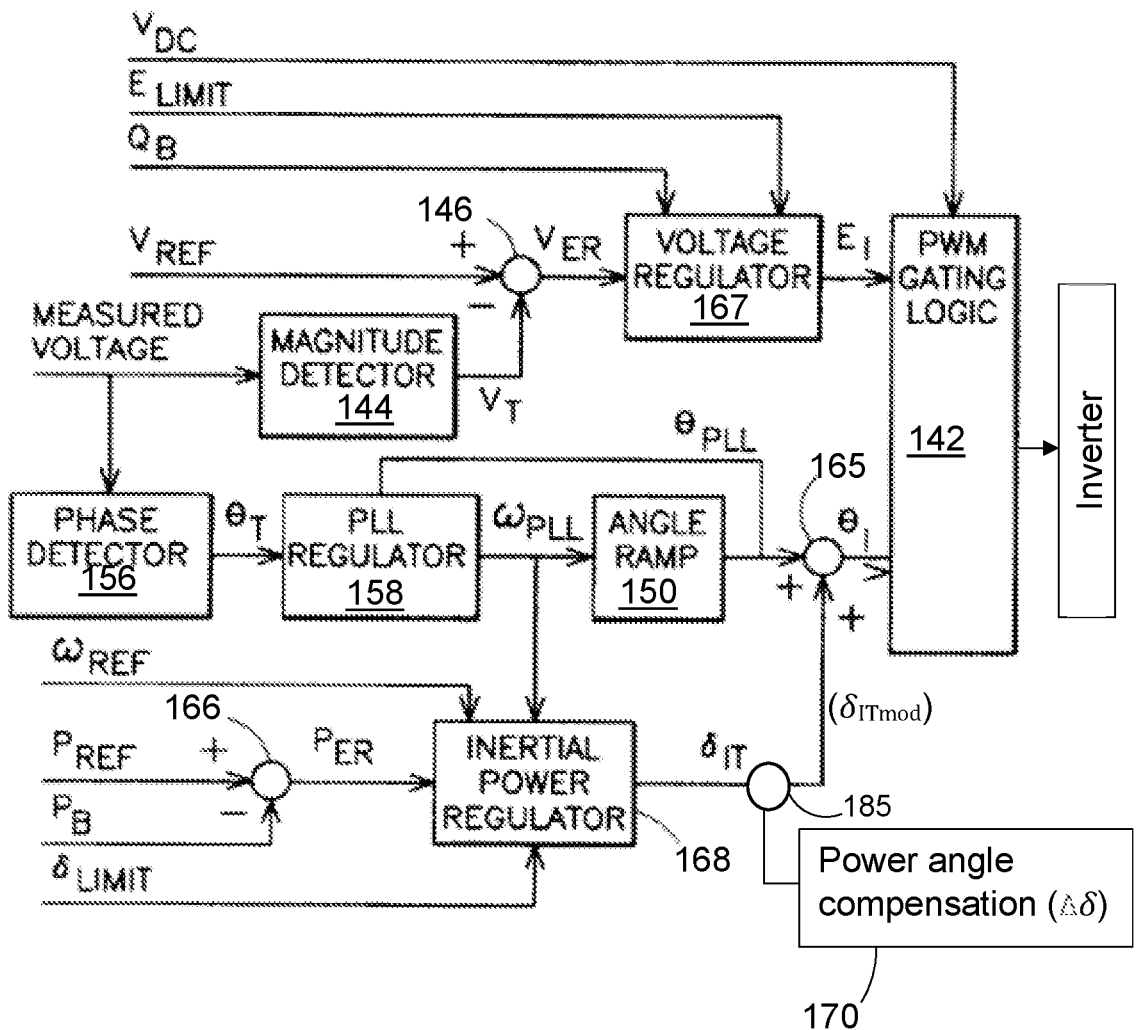
FIG. 7 is a control diagram for operation of an inverter-based resource having an asynchronous machine in grid-forming mode according to the present disclosure.

FIG. 7 illustrates a basic control for an IBR energy system that is connected to a utility system (e.g., a grid), wherein the inverter is controlled via gate pulses from the PWM gating logic 142. The basic control provides synchronizing functions to synchronize the inverter output waveform to the power utility waveform, both in phase and frequency. The synchronizing function is provided by detecting the phase of the measured voltage output from the power inverter in a phase detector 156. The output signal OT from phase detector 156 represents the phase of the voltage VT, which is the voltage supplied by the utility. The phase signal is supplied to a phase lock loop (PLL) regulator 158 of a type well known in the art that generates a phase lock loop frequency output signal $\omega_{PLL}$. The signal $\omega_{PLL}$ is supplied to the angle ramp generator 150, which generates the phase lock loop feedback signal $\theta_{PLL}$ supplied as a feedback signal to the PLL regulator 158. The phase lock loop circuit including the PLL regulator and angle ramp generator 150 is a conventional type of phase regulator well known in the art and provides the synchronizing function to control the phase of the inverter terminal voltage E1. The signal $\theta_T$ from the phase detector 156 is the angle between the reference and the terminal bus voltage VT. As long as the system is operating in steady state, the angle $\theta_T$ and the angle $\theta_{PLL}$ will be the same angle. Since the control of FIG. 7 is intended to be operated in conjunction with utility power, there is no separate independent frequency reference signal supplied to the phase lock loop.

The phase signal provides a means for controlling the amount of real power supplied by the power inverter. More particularly, the amount of reactive power versus the amount of real power coupled through the transformer to the grid can be adjusted by controlling the angle $\theta1$. The phase shift signal ($\delta_{IT}$) generated by the inertial power regulator 168 is used to adjust the value of $\theta1$ to vary this angle and thereby to control the amount of real power flowing through the transformer. The inertial power regulator 168 operates as an integrator on a power error signal $P_{ER}$ and is also influenced by the signal $\omega_{PLL}$ supplied to the angle ramp generator 150. The phase shift signal ($\delta_{IT}$) is summed with $\theta_{PLL}$ at the summer 165 to produce $\theta1$. The power error signal $P_{ER}$ is generated by the difference between an actual measured real power component $P_B$ and a power reference $P_{REF}$ developed at the summing junction 166, where the power reference signal $P_{REF}$ represents the desired power output of the inverter. A $\delta_{LIMIT}$ signal supplied to the inertial power regulator 164 controls the limits by which the value of ($\delta_{IT}$) can be varied to control the angle between $V_T$ and E1.

Still referring to FIG. 7, the frequency reference signal $\omega_{REF}$ is provided to the inertial power regulator 168 along with the coupling of the signal $\omega_{PLL}$ from the phase lock loop. The signal $\omega_{REF}$ represents a desired frequency of the output voltage generated by the inverter and would typically be representative of a frequency of 60 Hz for U.S. use. The signal $\omega_{PLL}$ during stable operation represents the actual output voltage frequency.

In FIG. 7, in accordance with aspects of the present invention, a power angle compensation ($\Delta\delta$) is generated at 170 and summed with the phase shift signal $\delta_{IT}$ generated by the inertial power regulator 168 at summing junction 185. As discussed above, the power angle compensation ($\Delta\delta$) serves to provide damping of power oscillations similar to damping windings in a synchronous machine, particularly in the event of a transient condition such as an LVRT, HVRT, or MFRT event.

Figure 8:
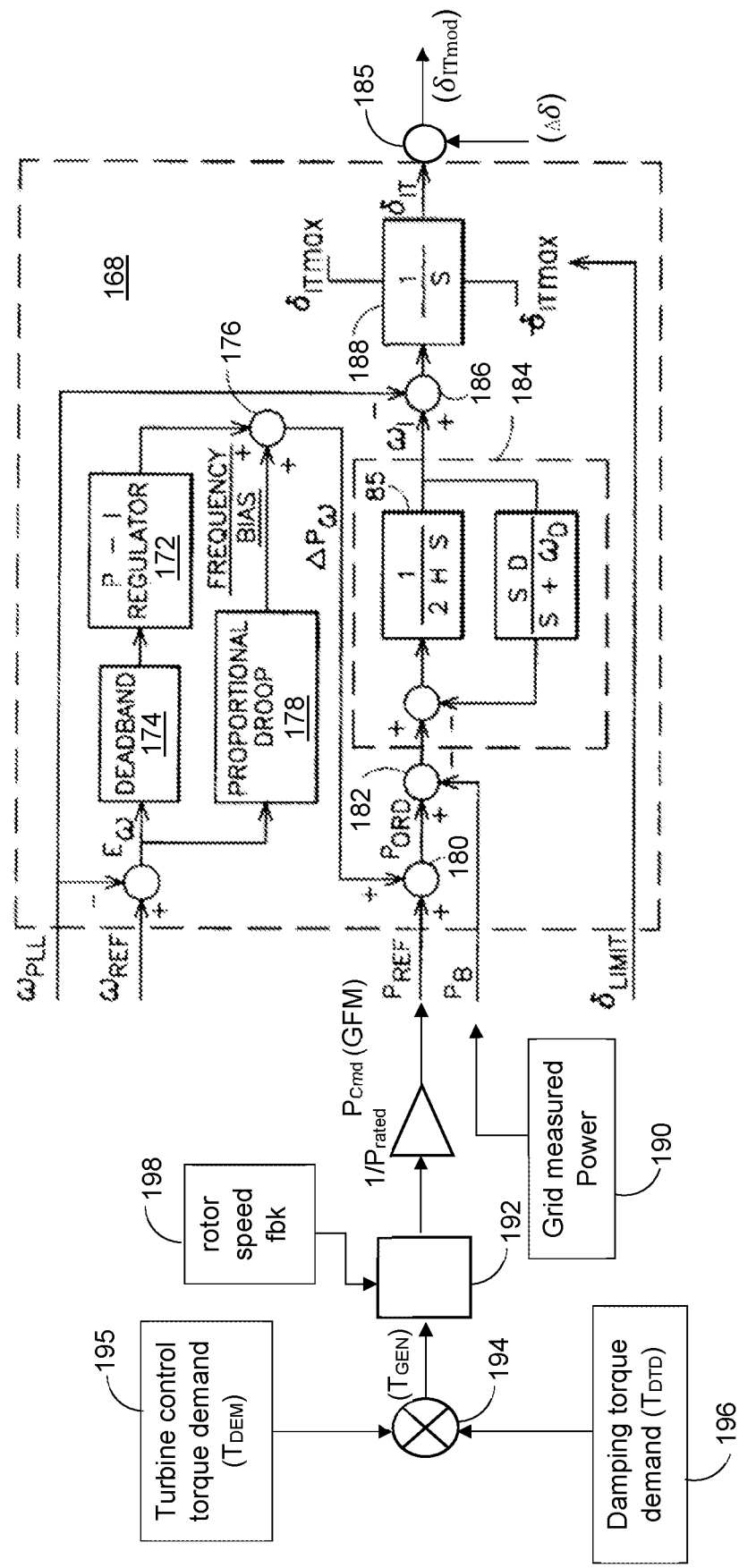
FIG. 8 is a control diagram related to the internal power regulator depicted in FIG. 7.

FIG. 8 is an expanded block diagram for control of an IBR (e.g., a doubly-fed induction generator in a wind turbine power system) in grid-forming mode (GFM). This control scheme may be utilized as an initial, stand-alone control or subsequently implemented when it is determined that the power angle compensation ($\Delta\delta$) described above with respect to FIG. 7 is inadequate to reduce drivetrain loads below a defined limit. At 195, the turbine controller generates a torque demand ($T_{DEM}$) that, at a given generator speed, is the torque necessary to obtain maximum power efficiency of the generator. This torque demand ($T_{DEM}$) is generated based on a mathematical relationship between generator speed and generator torque to optimize generator power output. $T_{DEM}$ depends on maximum power point tracking of the wind turbine at a certain wind speed and generator speed. At 196, a damping torque demand ($T_{DTD}$) signal is generated and summed at 194 with the turbine control torque demand 195 to provide a generator torque signal ($T_{GEN}$) 197. This ($T_{DTD}$) signal modulates the torque demand $T_{DEM}$ signal based on changes in generator rotor speed to minimize excessive vibrations in the machine.

Block 198 represents the high speed shaft (HSS) sensor output (in rad/sec), which is multiplied at block 192 with ($T_{GEN}$) (in kNm), which produces a power command that is divided by rated power (Prated) to give unit power.

The generator torque demand ($T_{GEN}$) is correlated to a grid-forming power command $P_{Cmd}$ (GFM) signal corresponding to the reference power $P_{REF}$ (the desired power output of the inverter).

Still referring to FIG. 8, the frequency reference signal $\omega_{REF}$ and the phase lock loop frequency signal $\omega_{PLL}$ are combined to generate the frequency error signal E$\omega$. As can be seen, the $\omega_{PLL}$ signal (the actual frequency of the inverter output) is subtracted from the $\omega_{REF}$ signal in a summing junction to generate the E$\omega$ error signal. The E$\omega$ error signal is provided to a frequency bias circuit comprising a first control loop including a conventional proportional plus integral (P-I) regulator 172 and a deadband circuit 174. The deadband circuit provides some range of variation of the frequency error signal, for example, approximately ½ Hz without any change of output signal. This limits response due to natural fluctuations of the power system frequency. The P-I regulator 172 converts the error signal to a conventional bias signal that is applied to a summing junction 176. A second loop includes a proportional droop circuit 178, which may be an amplifier with a fixed gain that receives the E$\omega$ error signal and provides an immediate compensation signal to the summing junction 176, the compensation signal being added to the output signal from the P-I regulator 172. The output of the summing junction 176 is a power offset signal that is coupled to a summing junction 180 whose other input is the power reference signal $P_{REF}$. Accordingly, the frequency offset signal from summing junction 176 serves to modify the power reference signal. The purpose of such modification is to adjust the power reference signal $P_{REF}$ as a function of frequency shifts. More particularly, the system attempts to hold the system output frequency constant so that if there is an error between the output frequency and the reference frequency, the power reference signal $P_{REF}$ is adjusted to compensate for the frequency error. Still further, the power system to which the inverter is coupled may include reactive loads such as alternating current induction and synchronous motors whose speed is directly related to the frequency of the inverter output signal. If additional power is supplied from the inverter, the machines will tend to accelerate while a reduction in power will cause the frequency to drop due to the inductive reaction of the machines as they begin to slow down. Accordingly, the frequency bias circuit provides an important function in enabling control of the torque output of the machines coupled to the inverter output.

The inertial power regulator 168 includes an inertial regulator 184 that modifies the power error signal $P_{REF}$ to simulate the inertia of synchronous machines, thereby providing the VSM control functionality. More particularly, the inertial regulator 184 prevents sudden frequency changes or power changes that can cause transient torques to be generated by the motors coupled to the inverter output if sudden changes in the inverter output are experienced. The inertial regulator 184 comprises a conventional electronic circuit having the characteristics of an integrator in that its output signal gradually increases in response to an increase in the input signal.

If the power reference signal $P_{REF}$ is modified by the frequency bias circuit, the resultant signal identified as $P_{ORD}$ is developed at an output terminal of the summation circuit 180 and applied to a summation circuit 182 where the commanded power or ordered power is compared to the measured output power $P_B$ of the system. Note here that the signal $P_B$ represents the real power developed at the output of the inverter. The output signal from the summation circuit 182 represents the power error signal that is applied to the inertial regulator 184. The signal developed by the inertial regulator as described above represents the desired frequency $\omega_1$ of the internal voltage E1 and, if the frequency is properly tracking, will be the same as the frequency $\omega_{PLL}$. In this regard, the signal co1 developed at the output of the inertial regulator 184 is summed in a summing junction 186 with the $\omega_{PLL}$ signal. Any difference between the phase lock loop frequency and the signal co1 results in an error signal which is applied to an integrator 188 to develop the phase shift signal ($\delta_{IT}$) described above with regard to FIG. 7. As in FIG. 7, FIG. 8 depicts the power angle compensation ($\Delta\delta$) summed at 187 with the phase shift signal ($\delta_{IT}$) generated by the inertial power regulator 168 to produce a modified phase shift signal ($\delta_{ITmod}$).

The integrator 188 is a conventional type of integrator whose output signal ($\delta_{IT}$) is an angle offset that is summed with the output signal from the phase lock loop described in FIG. 7 to generate the output power angle signal $\theta_1$. It will be recognized that the $\omega_{PLL}$ signal is taken from the phase lock loop as shown in FIG. 7 and therefore represents the actual frequency of the inverter output signal. In the event that the utility breaker opens suddenly, the $\omega_{PLL}$ signal will represent the actual frequency of the voltage being generated by the inverter and the power regulator will cause the power output of the inverter to be adjusted as a function of the variation in output frequency. The integrator 185 in the inertial regulator 184 limits any attempted frequency change in the control system. It will be recognized that the settings of the deadband 174 and the gain at the proportional droop block 178 are selected to coordinate with the variations of the power system to which the inverter is connected and also with the loads to which the inverter is to supply power. Furthermore, the system can be adapted to modify the settings of the deadband 174, proportional droop 178, and the inertial regulator 184 in an adaptive manner such as when the status of the utility breaker is changed, either to connect the utility to the system or to disconnect the utility from the load system.

When the energy system is connected to the utility, the frequency bias circuit and the inertial power regulator force the system to operate as though the generator were another synchronous machine connected to the utility power. This permits protection circuit and system operation procedures to be virtually the same as standard utility practice. The ability to dynamically adjust parameters for inertia, damping and frequency bias permits the energy system to provide a beneficial impact on the overall power system when connected.

Referring to FIG. 9, an embodiment of a derivation of the power angle compensation ($\Delta\delta$) is depicted. As described above, initially, a power error signal ($P_{ER}$) is determined (FIG. 7) between an actual real power output ($P_B$) from the renewable energy source and a power reference ($P_{REF}$) representing a desired power output of the renewable energy source. With the inertial power regulator 168, a phase shift angle ($\delta_{IT}$) is generated from the power error signal ($P_{ER}$) to provide virtual synchronous machine (VSM) control functionality to the GFM control of the renewable energy source. The power angle compensation ($\Delta\delta$) is applied to the phase shift angle ($\delta_{IT}$) from the inertial power regulator to dampen power oscillations and load fluctuations during transient power events.

Still referring to FIG. 9, the power angle compensation ($\Delta\delta$) may be derived as a function of the power error signal ($P_{ER}$) according to the following:

Power angle compensation ($\Delta\delta$)=f($\Delta$Pe0, B)
B=E1*Vg/X1
Pe0=(E1*Vg/X1)*sin($\delta$0)
($\Delta$Pe0)=Kp*(Pref−Pfbk)
Kp=control gain constant
($\Delta\delta$)=Sin$^{-1}$(Pe0+Pe0/B)−$\delta$0
($\Delta\delta$) $\Delta$Pe0/B
E1: terminal voltage of machine operating as a VSM
$\delta$: Power angle
X1: effective impedance of machine (stator leakage+ virtual impedance)
Pe0: steady state power of machine
Vg: grid voltage at steady state power In the embodiment depicted in FIG. 10, the DFIG is operated in torque control (see FIG. 8) such that a torque demand ($T_{DEM}$) is generated and modified by a damping torque demand ($T_{DTD}$) to provide a generator torque demand ($T_{GEN}$) made on the DFIG. In this embodiment, the power angle compensation ($\Delta\delta$) is a function of torsion induced in drivetrain components of the wind turbine power system and serves as an additional damping torque demand ($T_{DTDadd}$). A value for torsion may be calculated based on a speed difference between a high speed shaft (HSS) and a low speed shaft (LSS) in the drivetrain components, or may be estimated based on the HSS speed and torque acting on the HSS.

Still referring to FIG. 10, the power angle compensation ($\Delta\delta$) may be derived from the torsion, grid voltage, effective impedance of the wind turbine power system, and terminal voltage of the DFIG according to:

Power angle compensation ($\Delta\delta$)=f($\Delta$Pe0, B)
B=E1*Vg/X1
Pe0=(E1*Vg/X1)*sin($\delta$0)
Additional DTD torque ($T_{DTDadd}$)=Kp*torsion
Kp=control gain constant
($\Delta$Pe0)=Speed*($T_{DTDadd}$)
($\Delta\delta$)=Sin$^{-1}$(Pe0+Pe0/B)−$\delta$0
($\Delta d$)~$\Delta$Pe0/B
E1: terminal voltage of machine operating as a VSM
$\delta$: Power angle
X1: effective impedance of machine (stator leakage+ virtual impedance)
Pe0: steady state power of machine
Vg: grid voltage at steady state power As mentioned, the control functions described herein may be activated after detection of the grid event (e.g., a LVRT event) and when slider gain is greater than zero but below a threshold value. Slider gain is linked to LVRT and essentially drops to zero when the voltage initially drops. When grid voltage returns (post voltage drop), slider gain starts to increase along with power oscillations and marks the start of the LVRT recovery period. The power oscillations decrease until power reaches a steady state value, at which point slider gain also reaches a steady state power. "Slider gain" can be detected and essentially defines the recovery period after the LVRT event as the period when slider gain increases from zero until reaching its steady state value.

Other activation scenarios are also possible. For example, grid voltage could be sensed and the control function activated when such voltage indicates voltage ride through recovery.

It should be understood that the present invention encompasses an inverter-based renewable energy source connected to a power grid, the inverter-based resource including an asynchronous machine and a controller for controlling the inverter-based resource to provide grid-forming mode (GFM) control thereof. The controller includes a processor configured to perform the plurality of operations described above with respect to the various method embodiments of the invention.

The inverter-based renewable energy source may be a wind turbine power system wherein the asynchronous machine is a doubly-fed induction generator (DFIG).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A method for providing grid-forming mode (GFM) control of an inverter-based renewable energy source having an asynchronous machine connected to a power grid, the method comprising: deriving a power error signal ($P_{ER}$) between an actual real power output ($P_B$) from the renewable energy source and a power reference ($P_{REF}$) representing a desired power output of the renewable energy source; with an inertial power regulator, generating a phase shift angle ($\Delta_{IT}$) from the power error signal ($P_{ER}$) to provide virtual synchronous machine (VSM) control functionality to the GFM control of the renewable energy source; and applying a power angle compensation ($\Delta\delta$) to the phase shift angle ($\delta_{IT}$) from the inertial power regulator to dampen power oscillations and load fluctuations during transient power events.

Clause 2: The method according to clause 1, wherein the inverter-based renewable energy source is a wind turbine power system and the asynchronous machine is a doubly-fed induction generator (DFIG).

Clause 3: The method according to any one of clause 1-2, wherein the transient power events include a low voltage ride through (LVRT) event.

Clause 4: The method according to any one of clause 1-3, further comprising activating the power angle compensation after the LVRT event and slider gain is below a threshold value.

Clause 5: The method according to any one of clause 1-4, wherein the phase shift signal ($\delta_{IT}$) is used to adjust a value of a phase angle ($\theta_1$) provided to gating logic circuitry of the wind turbine power system, the power angle compensation ($\Delta\delta$) used to adjust the phase shift signal ($\delta_{IT}$).

Clause 6: The method according to any one of clause 1-5, wherein the power angle compensation ($\Delta\delta$) is derived as a function of the power error signal ($P_{ER}$) input to the inertial power regulator.

Clause 7: The method according to any one of clause 1-6, wherein the function is according to:

Power angle compensation ($\Delta\delta$)=f($\Delta$Pe0, B)
B=E1*Vg/X1
Pe0=(E1*Vg/X1)*sin($\delta$0)
($\Delta$Pe0)=Kp*(Pref−Pfbk)
Kp=control gain constant
($\Delta\delta$)=Sin$^{-1}$(Pe0+Pe0/B)−$\delta$0
($\Delta\delta$)~$\Delta$Pe0/B
E1: terminal voltage of machine operating as a VSM δ: Power angle X1: effective impedance of machine (stator leakage+ virtual impedance)

Pe0: steady state power of machine

Vg/0: grid voltage at steady state power

Clause 8: The method according to any one of clause 1-7, wherein the DFIG is subsequently operated in torque control to further reduce drive train loads, wherein a torque demand ($T_{DEM}$) is generated and modified by a damping torque demand ($T_{DTD}$) to provide a generator torque demand ($T_{GEN}$) made on the DFIG, and wherein the power angle compensation ($\Delta\delta$) is a function of torsion induced in drivetrain components of the wind turbine power system and serves as an additional damping torque demand ($T_{DTDadd}$).

Clause 9: The method according to any one of clause 1-8, wherein the torsion is calculated based on a speed difference between a high speed shaft (HSS) and a low speed shaft (LSS) in the drivetrain components, or is estimated based on the HSS speed and torque acting on the HSS.

Clause 10: The method according to any one of clause 1-9, wherein the power angle compensation ($\Delta\delta$) is derived from the torsion, grid voltage, effective impedance of the wind turbine power system, and terminal voltage of the DFIG according to:

($\Delta\delta$)=f($\Delta$Pe0, B)

B=E1*Vg/X1

Pe0=(E1*Vg/X1)*sin(δ0)

Additional DTD torque ($T_{DTDadd}$)=Kp*torsion

Kp=control gain constant ($\Delta$Pe0)=Speed*($T_{DTDadd}$)

($\Delta\delta$)=Sin$^{-1}$(Pe0+Pe0/B)−δ0

($\Delta\delta$)~$\Delta$Pe0/B

E1: terminal voltage of machine operating as a VSM

δ: Power angle

X1: effective impedance of machine (stator leakage+ virtual impedance)

Pe0: steady state power of machine

Vg/0: grid voltage at steady state power

Clause 11: An inverter-based renewable energy source connected to a power grid, the inverter-based resource comprising: an asynchronous machine; a controller for controlling the inverter-based resource to provide grid-forming mode (GFM) control thereof, the controller comprising a processor configured to perform a plurality of operations, the plurality of operations comprising: deriving a power error signal ($P_{ER}$) between an actual real power output ($P_B$) from the renewable energy source and a power reference ($P_{REF}$) representing a desired power output of the renewable energy source; with an inertial power regulator, generating a phase shift angle ($\Delta_{IT}$) from the power error signal ($P_{ER}$) to provide virtual synchronous machine (VSM) control functionality to the GFM control of the renewable energy source; and applying a power angle compensation ($\Delta\delta$) to the phase shift angle ($\Delta_{IT}$) from the inertial power regulator to dampen power oscillations and load fluctuations during transient power events.

Clause 12: The inverter-based renewable energy source according to clause 11, wherein the inverter-based renewable energy source is a wind turbine power system and the asynchronous machine comprises a doubly-fed induction generator (DFIG).

Clause 13: The inverter-based renewable energy source according to any one of clause 11-12, wherein the plurality of operations further comprises activating the power angle compensation after the LVRT event and slider gain is below a threshold value.

Clause 14: The inverter-based renewable energy source according to any one of clause 11-13, wherein the phase shift signal ($\delta_{IT}$) used to adjust a value of a phase angle ($\theta_1$) provided to gating logic circuitry, the power angle compensation ($\Delta\delta$) used to adjust the phase shift signal ($\delta_{IT}$).

Clause 15: The inverter-based renewable energy source according to any one of clause 11-14, wherein the power angle compensation ($\Delta\delta$) is derived as a function of the power error signal ($P_{ER}$) input to the inertial power regulator according to:

Power angle compensation ($\Delta\delta$)=f($\Delta$Pe0, B)

B=E1*Vg/X1

Pe0=(E1*Vg/X1)*sin(δ0)

($\Delta$Pe0)=Kp*(Pref−Pfbk)

($\Delta\delta$)=Sin$^{-1}$(Pe0+Pe0/B)−δ0

($\Delta\delta$)~($\Delta$Pe0/B)

E1: terminal voltage of machine operating as a VSM

δ: Power angle

X1: effective impedance of machine (stator leakage+ virtual impedance)

Pe0: steady state power of machine

Vg: grid voltage at steady state power

Clause 16: The inverter-based renewable energy source according to any one of clause 11-15, the plurality of operations includes: subsequently operating the DFIG in torque control to reduce drivetrain loads wherein a torque demand ($T_{DEM}$) is generated and modified by a damping torque demand ($T_{DTD}$) to provide a generator torque demand ($T_{GEN}$) made on the DFIG, the power angle compensation ($\Delta\delta$) functioning as an additional damping torque demand (DTD); deriving the power angle compensation ($\Delta\delta$) as a function of torsion induced in drivetrain components of the wind turbine power system according to:

Power angle compensation ($\Delta\delta$)=f($\Delta$Pe0, B)

B=E1*Vg/X1

Pe0=(E1*Vg/X1)*sin(δ0)

Additional DTD torque ($T_{DTDadd}$)=Kp*torsion

Kp=control gain constant ($\Delta$Pe0)=Speed*($T_{DTDadd}$)

($\Delta\delta$)=Sin$^{-1}$(Pe0+Pe0/B)−δ0

($\Delta\delta$)~$\Delta$Pe0

E1: terminal voltage of DFIG machine operating as a VSM

δ: Power angle

X1: effective impedance of machine (stator leakage+ virtual impedance)

Pe0: steady state power of machine

Vg: grid voltage at steady state power; and

Clause 17: The inverter-based renewable energy source according to any one of clause 11-16, wherein the torsion is calculated based on a speed difference between a high speed shaft (HSS) and a low speed shaft (LSS) in the drivetrain components, or is estimated based on the HSS speed and torque acting on the HSS.

What is claimed is:

1. A method for providing grid-forming mode (GFM) control of an inverter-based renewable energy source having an asynchronous machine connected to a power grid, the method comprising:

deriving a power error signal ($P_{ER}$) between an actual real power output ($P_B$) from the renewable energy source and a power reference ($P_{REF}$) representing a desired power output of the renewable energy source;

with an inertial power regulator, generating a phase shift angle ($\Delta\delta$) from the power error signal ($P_{ER}$) to provide virtual synchronous machine (VSM) control functionality to the GFM control of the renewable energy source; and applying a power angle compensation ($\Delta\delta$) to the phase shift angle ($\delta_{IT}$) from the inertial power regulator to dampen power oscillations and load fluctuations during transient power events.

2. The method according to claim 1, wherein the inverter-based renewable energy source is a wind turbine power system and the asynchronous machine is a doubly-fed induction generator (DFIG).

3. The method according to claim 2, wherein the transient power events include a low voltage ride through (LVRT) event.

4. The method according to claim 3, further comprising activating the power angle compensation after the LVRT event and slider gain is below a threshold value.

5. The method according to claim 2, wherein the phase shift signal ($\delta_{IT}$) is used to adjust a value of a phase angle ($\theta_1$) provided to gating logic circuitry of the wind turbine power system, the power angle compensation ($\Delta\delta$) used to adjust the phase shift signal ($\delta_{IT}$).

6. The method according to claim 5, wherein the power angle compensation ($\Delta\delta$) is derived as a function of the power error signal ($P_{ER}$) input to the inertial power regulator.

7. The method according to claim 6, wherein the function is according to:

Power angle compensation ($\Delta\delta$)=f($\Delta$Pe0, B)
  B=E1*Vg/X1
  Pe0=(E1*Vg/X1)*sin($\delta$0)
  ($\Delta$Pe0)=Kp*(Pref−Pfbk)
  Kp=control gain constant
  ($\Delta\delta$)=Sin$^{-1}$(Pe0+Pe0/B)−$\delta$0
  ($\Delta\delta$)~$\Delta$Pe0/B
E1: terminal voltage of machine operating as a VSM
$\delta$: Power angle
X1: effective impedance of machine (stator leakage+ virtual impedance)
Pe0: steady state power of machine
Vg: grid voltage at steady state power.

8. The method according to claim 6, wherein the DFIG is subsequently operated in torque control to further reduce drive trail loads, wherein a torque demand ($T_{DEM}$) is generated and modified by a damping torque demand ($T_{DTD}$) to provide a generator torque demand ($T_{GEN}$) made on the DFIG, and wherein the power angle compensation ($\Delta\delta$) is a function of torsion induced in drivetrain components of the wind turbine power system and serves as an additional damping torque demand ($T_{DTDadd}$).

9. The method according to claim 8, wherein the torsion is calculated based on a speed difference between a high speed shaft (HSS) and a low speed shaft (LSS) in the drivetrain components, or is estimated based on the HSS speed and torque acting on the HSS.

10. The method according to claim 9, wherein the power angle compensation ($\Delta\delta$) is derived from the torsion, grid voltage, effective impedance of the wind turbine power system, and terminal voltage of the DFIG according to:

($\Delta\delta$)=f($\Delta$Pe0,B)
  B=E1*Vg/X1
  Pe0=(E1*Vg/X1)*sin(60)
  Additional DTD torque ($T_{DTDadd}$)=Kp*torsion
  Kp=control gain constant
  ($\Delta\Delta$Pe0)=Speed*($T_{DTDadd}$)
  ($\Delta\delta$)=Sin$^{-1}$(Pe0+Pe0/B)−$\delta$0
  ($\Delta\delta$)~$\Delta$Pe0/B
E1: terminal voltage of machine operating as a VSM
$\delta$: Power angle
X1: effective impedance of machine (stator leakage+ virtual impedance)
Pe0: steady state power of machine
Vg: grid voltage at steady state power.

11. An inverter-based renewable energy source connected to a power grid, the inverter-based resource comprising:
an asynchronous machine;
a controller for controlling the inverter-based resource to provide grid-forming mode (GFM) control thereof, the controller comprising a processor configured to perform a plurality of operations, the plurality of operations comprising:
  deriving a power error signal ($P_{ER}$) between an actual real power output ($P_B$) from the renewable energy source and a power reference ($P_{REF}$) representing a desired power output of the renewable energy source;
  with an inertial power regulator, generating a phase shift angle ($\delta_{IT}$) from the power error signal ($P_{ER}$) to provide virtual synchronous machine (VSM) control functionality to the GFM control of the renewable energy source; and
  applying a power angle compensation ($\Delta\delta$) to the phase shift angle ($\delta_{IT}$) from the inertial power regulator to dampen power oscillations and load fluctuations during transient power events.

12. The inverter-based renewable energy source according to claim 11, wherein the inverter-based renewable energy source is a wind turbine power system and the asynchronous machine comprises a doubly-fed induction generator (DFIG).

13. The inverter-based renewable energy source according to claim 12, wherein the plurality of operations further comprises activating the power angle compensation after an LVRT event and slider gain is below a threshold value.

14. The inverter-based renewable energy source according to claim 12, wherein the phase shift signal ($\delta_{IT}$) used to adjust a value of a phase angle ($\theta_1$) provided to gating logic circuitry, the power angle compensation ($\Delta\delta$) used to adjust the phase shift signal ($\delta_{IT}$).

15. The inverter-based renewable energy source according to claim 14, wherein the power angle compensation ($\Delta\delta$) is derived as a function of the power error signal ($P_{ER}$) input to the inertial power regulator according to:

Power angle compensation ($\Delta\delta$)=f($\Delta$Pe0, B)
  B=E1*Vg/X1
  Pe0=(E1*Vg/X1)*sin($\delta$0)
  ($\Delta$Pe0)=Kp*(Pref−Pfbk)
  ($\Delta\delta$)=Sin$^{-1}$(Pe0+Pe0/B)−$\delta$0
  ($\Delta\delta$)~$\Delta$Pe0/B
E1: terminal voltage of machine operating as a VSM
$\delta$: Power angle
X1: effective impedance of machine (stator leakage+ virtual impedance)
Pe0: steady state power of machine
Vg: grid voltage at steady state power.

16. The inverter-based renewable energy source according to claim 12, the plurality of operations includes:
subsequently operating the DFIG in torque control to reduce drivetrain loads wherein a torque demand ($T_{DEM}$) is generated and modified by a damping torque demand ($T_{DTD}$) to provide a generator torque demand ($T_{GEN}$) made on the DFIG, the power angle compensation ($\Delta\delta$) functioning as an additional damping torque demand (DTD);

deriving the power angle compensation ($\Delta\delta$) as a function of torsion induced in drivetrain components of the wind turbine power system according to:

$(\Delta\delta) = f(\Delta Pe0, B)$
$B = E1 \cdot Vg/X1$
$Pe0 = (E1 \cdot Vg/X1) \cdot \sin(\delta0)$
Additional DTD torque $(T_{DTDadd}) = Kp \cdot \text{torsion}$
$Kp$ = control gain constant
$(\Delta Pe0) = \text{Speed} \cdot (T_{DTDadd})$
$(\Delta\delta) = \sin^{-1}(Pe0 + Pe0/B) - \delta0$
$(\Delta\delta) \sim \Delta Pe0/B$ E1: terminal voltage of DFIG machine operating as a VSM
$\delta$: Power angle
X1: effective impedance of machine (stator leakage+ virtual impedance)
Pe0: steady state power of machine
Vg: grid voltage at steady state power.

17. The inverter-based renewable energy source according to claim 16, wherein the torsion is calculated based on a speed difference between a high speed shaft (HSS) and a low speed shaft (LSS) in the drivetrain components, or is estimated based on the HSS speed and torque acting on the HSS.

\* \* \* \* \*